(12) United States Patent
Pop et al.

(10) Patent No.: US 8,976,920 B2
(45) Date of Patent: Mar. 10, 2015

(54) NUCLEAR POWER PLANT USING NANOPARTICLES IN EMERGENCY SYSTEMS AND RELATED METHOD

(75) Inventors: Mihai G. M. Pop, Lynchburg, VA (US); Brian Glenn Lockamon, Evington, VA (US)

(73) Assignee: Areva NP, Courbevoie (FR)

( * ) Notice: Subject to any disclaimer, the term of this patent is extended or adjusted under 35 U.S.C. 154(b) by 671 days.

(21) Appl. No.: 11/713,144

(22) Filed: Mar. 2, 2007

(65) Prior Publication Data
US 2008/0212733 A1 Sep. 4, 2008

(51) Int. Cl.
*G21C 15/18* (2006.01)
*G21C 15/28* (2006.01)
*G21C 15/00* (2006.01)

(52) U.S. Cl.
CPC ......... *G21C 15/182* (2013.01); *G21Y 2002/201* (2013.01); *G21Y 2002/50* (2013.01); *G21Y 2004/30* (2013.01); *G21Y 2004/40* (2013.01); *Y02E 30/40* (2013.01)
USPC ............ 376/282; 376/277; 376/305; 376/306

(58) Field of Classification Search
USPC .................................. 376/305, 306, 277, 282
See application file for complete search history.

(56) References Cited

U.S. PATENT DOCUMENTS

| | | | | |
|---|---|---|---|---|
| 4,587,080 A | * | 5/1986 | Johnson | 376/282 |
| 4,694,693 A | * | 9/1987 | Gerlowski | 73/168 |
| 6,724,854 B1 | * | 4/2004 | Kim et al. | 376/306 |
| 6,793,883 B2 | | 9/2004 | Andresen et al. | 422/7 |
| 6,810,099 B2 | | 10/2004 | Nakamaru et al. | 376/293 |
| 6,928,134 B1 | * | 8/2005 | Puthawala et al. | 376/306 |

FOREIGN PATENT DOCUMENTS

WO WO 2008/005590 1/2008

OTHER PUBLICATIONS

Buongiorno et al., Use of Nanofluids for Enhanced Economies and Safety of Nuclear Reactors, Nov. 26, 2006, COE-INES International Symposium, INES-2.*
R. Hannink, J. Buongiorno, L.W. Hu "In-Vessel Retention Enhancement through the Use of Nanofluids" ANS Winter Congress Proceedings, Albuquerque, New Mexico, Nov. 12-16, 2006, (2 pages).
S.J. Kim, B. Troung, J. Buongiorno; L.W. Hu, I.C. Bang, "Surface wettability change during pool boiling of nanofluids and its effect on critical heat flux", International Journal of Heat and Mass Transfer, Jan. 22, 2007, (12 pages).
X. Wang, X. Xu, and S. U. S. Choi, "Thermal Conductivity of Nanoparticle—Fluid Mixture" J. of Thermo-physics and Heat Transfer, vol. 13, pp. 474-480, 1999.

(Continued)

*Primary Examiner* — Bernarr Gregory
(74) *Attorney, Agent, or Firm* — Davidson, Davidson & Kappel, LLC

(57) ABSTRACT

A nuclear power plant with an improved cooling system using nanoparticles in solid or fluid form is provided. The nanoparticles are delivered in locations such as the cold leg accumulator and high and low pressure pumps of an emergency core cooling system. Motor driven valves and pressurization can aid in the delivery. Methods for providing the nanoparticles are also provided.

30 Claims, 4 Drawing Sheets

(56) References Cited

OTHER PUBLICATIONS

J. A. Eastman, S. U. S. Choi, S. Li, W. Yu, and L. J. Thompson, "Anomalously increased effective thermal conductivities of ethylene glycol-based nanofluids containing copper nanoparticles," Appl. Phys. Lett., vol. 78, pp. 718-720, 2001.

H. E. Patel, S. K. Das, T. Sundararajan, A. S. Nair, B. George, and T. Pradeep, "Thermal conductivities of naked and monolayer protected metal nanoparticle based nanofluids: Manifestation of anomalous enhancement and chemical effects," Appl. Phys. Lett., vol. 83, pp. 2931-2933, 2003.

H. Zhu, C. Zhang, S. Liu, Y. Tang, and Y. Yin, "Effects of nanoparticle clustering and alignment on thermal conductivities of $Fe_3O_4$ aqueous nanofluids," Appl. Phys. Lett., vol. 89, p. 023123, 2006; (4 pages).

J. Buongiorno and L. Hu, "Nanofluids for Enhanced Economics and Safety of Nuclear Reactors," MIT. Nov. 29, 2007, p. 15.

I. C. Bang et al., "Boiling Heat Transfer Performance and Phenomena of $Al_2O_3$-Water Nanofluids from a Plain Surface in a Pool," Int'l. J. of Heat and Mass Transfer vol. 48, No. 12, Jun. 1, 2005, pp. 2407 to 2419.

J. Buongiorno and L. Hu, "Nanofluid Coolants for Advanced Nuclear Power Plants," proceedings of ICAPP May 15-19, 2005, vol. 6, No. 5705, Apr. 2007.

R. Hannick, J. Buongiorno, L. Hu and G. Apostolakis, "Enhancement of the In-Vessel Retention Capabilities of Advanced Light Water Reactors Tthrough the Use of Nanofluids," proceedings of ICAPP May 13-16, 2007, No. 7106.

R. Hannick, J. Buongiorno, L. Hu and G. Apostolakis, "Using Nanofluids to Enhance the Capability of In-Vessel Retention of FuelFollowing Severe Reactor Accidents," Canes Publications, Advanced Nuclear Power Program, No. MIT-ANP-TR-116, Jun. 2007.

J. Buongiorno, L. Hu, S. Kim, R. Hannick, B. Truong, E. Forrest, "Use of Nanofluids for Enhanced Economics and Safety of Nuclear Reactors," COE-INES International Symposium, INES-2, Yokohoma, Japan, Nov. 26-30, 2006.

S. Kim, I. Bang, J. Buongiorno, and L. Hu, "Effects of Nanoparticle Deposition on Surface Wettability Influencing Heat Transfer in Nanofluids," Applied Physics Letters, AIP, American Institute of Physics, Melville, NY, vol. 89, No. 15, p. 153107-1-153107-3, Oct. 10, 2006.

R. Hannink, J. Buongiorno, and L.W. Hu "In-Vessel Retention Enhancement through the Use of Nanofluids" Transactions of the ANS, ANS, La Grange Park, Illinois, vol. 95, Jan. 1, 2006, pp. 691-692.

\* cited by examiner

NUCLEAR POWER PLANT USING NANOPARTICLES IN EMERGENCY SYSTEMS AND RELATED METHOD

BACKGROUND

The present invention relates general to nuclear power plants, and more specifically to the emergency systems of such power plants.

A nuclear power plant typically has a nuclear reactor and a reactor coolant system (RCS) for removing heat from the reactor and to generate power. The two most common types of reactors, boiling water reactors (BWRs) and pressurized water reactors (PWRs) are water-based. In a pressurized water reactor (PWR), pressurized, heated water from the reactor coolant system transfers heat to an electricity generator, which includes a secondary coolant stream boiling a coolant to power a turbine. In BWRs, the reactor boils the reactor coolant directly to produce steam for the electricity generator. The RCS section downstream of the electricity generators but upstream of the reactor typically is called the cold leg, and downstream of the reactor and upstream of the electricity generators is typically called the hot leg.

If a failure occurs in the RCS, in what is typically called a loss of coolant accident (LOCA), the nuclear core does not properly cool, temperature begins to rise in the reactor. The temperature of the fuel elements in the core rises and, if not checked, can cause melt and potentially void the reactor, releasing the melt into the containment building. One type of LOCA which can occur in both PWRs and BWRs is a main steam line break.

During a LOCA accident, a standard evolution of pressure and temperature inside the containment involves an increase in pressure to a few bars in 5-18 hours, with a maximum temperature around 150° C., which is reduced to atmospheric pressure and temperature in a few days. Nuclear power plants are designed to weather such an event with a considerable safety margin. The cooling process is based on the physical properties of water and air at those temperatures.

During a LOCA accident, an emergency core cooling system (ECCS) can be activated to cool the reactor by providing additional water to the RCS. An ECCS typically thus includes a high-pressure pump such as a centrifugal charging pump/high pressure injection pump (CCP/HPIP pump) exiting into the RCS. This can pump water from the refueling water storage tank (RWST), such as an in-containment RWST (IRWST), or a containment sump into the cold leg of the RCS. A volume control tank receiving water passing through a heat exchanger from the RCS cold leg can also provide water to the CCP/HPIP pump.

The ECCS also typically has a low-pressure pump, such as a residual heat removal or safety injection system pump (RHR/SIS pump), which can provide water from the RWST or containment sump to the cold and hot legs of the RCS, as well as water to a containment spray system. A heat exchanger is typically provided after the RHR/SIS pump.

The ECCS also typically has accumulators connected to the cold leg of the RCS storing water under pressure using pressurized nitrogen, as well as a pressurizer for providing extra pressure to the hot leg of the RCS and providing expansion volume to accommodate RCS volume and temperature transients.

Post-accident cooling has to do with both phenomena of natural convection heat transfer of air and the vapor phase inside the containment following a LOCA accident as well as with the boiling heat transfer inside the core during the LOCA condition.

The article entitled "In-Vessel Retention Enhancement through the Use of Nanofluids" describes using nanofluids for In-Vessel retention enhancement during an accident scenario. The conceptual nanofluid injection system includes two small tanks of concentrated nanofluid, with each tank capable of supplying enough nanofluid to provide enhancement predicted by a computational model. The injection is considered to occur upon the manual actuation of valves connected to injections lines. Instructions to actuate these valves are required to be placed in the severe accident procedures. The injection is said to be driven by gravity and overpressure provided by accumulators attached to the tanks. The injection lines are such that they can terminate in the reactor cavity, in the recirculation lines, or in the IRWST, depending on the physical space limitations within containment.

SUMMARY OF THE INVENTION

One object of the present invention is to increase the heat transfer from nuclear reactor and to evacuate the heat from the containment building under severe accident conditions in an effective manner.

The present invention provides a nuclear power plant comprising a reactor, a reactor coolant system, a generator powered by the reactor cooling system, an emergency core cooling system, the emergency core cooling system including an accumulator having an accumulator outlet exiting in the reactor coolant system, and a nanoparticle supply having a supply outlet exiting into the accumulator.

The present invention provides a nuclear power plant comprising a reactor, a reactor coolant system, a generator powered by the reactor coolant system, an emergency core cooling system, the emergency core cooling system including a refueling water storage tank or containment sump, a pump having a pump inlet providing water from the refueling water storage tank or containment sump and a pump outlet providing the water to the reactor coolant system, and a nanoparticle supply having a supply outlet between the pump and the refueling water storage tank or between the pump and the containment sump.

The present invention also provides a nuclear power plant comprising a reactor, a reactor coolant system, a generator powered by the reactor coolant system, an emergency core cooling system and a pressurized nanoparticle supply connected to the emergency core cooling system.

The present invention also provides a nuclear power plant comprising a reactor, a reactor coolant system, a generator powered by the reactor coolant system, an emergency core cooling system and a nanoparticle supply connected to the emergency core cooling system, the nanoparticle supply including a motor-driven valve.

The present invention also provides a method for improving severe accident heat removal capacity in a nuclear power plant comprising:

providing nanoparticles capable of being released with accumulator water of an emergency core cooling system during a severe accident.

The present invention also provides a method for improving severe accident heat removal capacity in a nuclear power plant comprising:

providing nanoparticles capable of being released upstream of a emergency core cooling system pump into water provided by a refueling water storage tank or a containment sump to the pump during a severe accident.

The present invention also provides a method for improving severe accident heat removal capacity in a nuclear power plant comprising:

providing a nanoparticle delivery system capable of pressurizing a medium containing nanoparticles prior to delivery to an emergency core cooling system.

The present invention also provides a method for improving severe accident heat removal capacity in a nuclear power plant comprising:

providing a nanoparticle supply capable of delivering nanoparticles during a post-accident phase when pressure in a containment is equal to that of a reactor cooling system pressure.

BRIEF DESCRIPTION OF THE DRAWINGS

One preferred embodiment of the present invention will be described with respect to the drawing in which.

DETAILED DESCRIPTION OF THE PREFERRED EMBODIMENT

Figure 1:
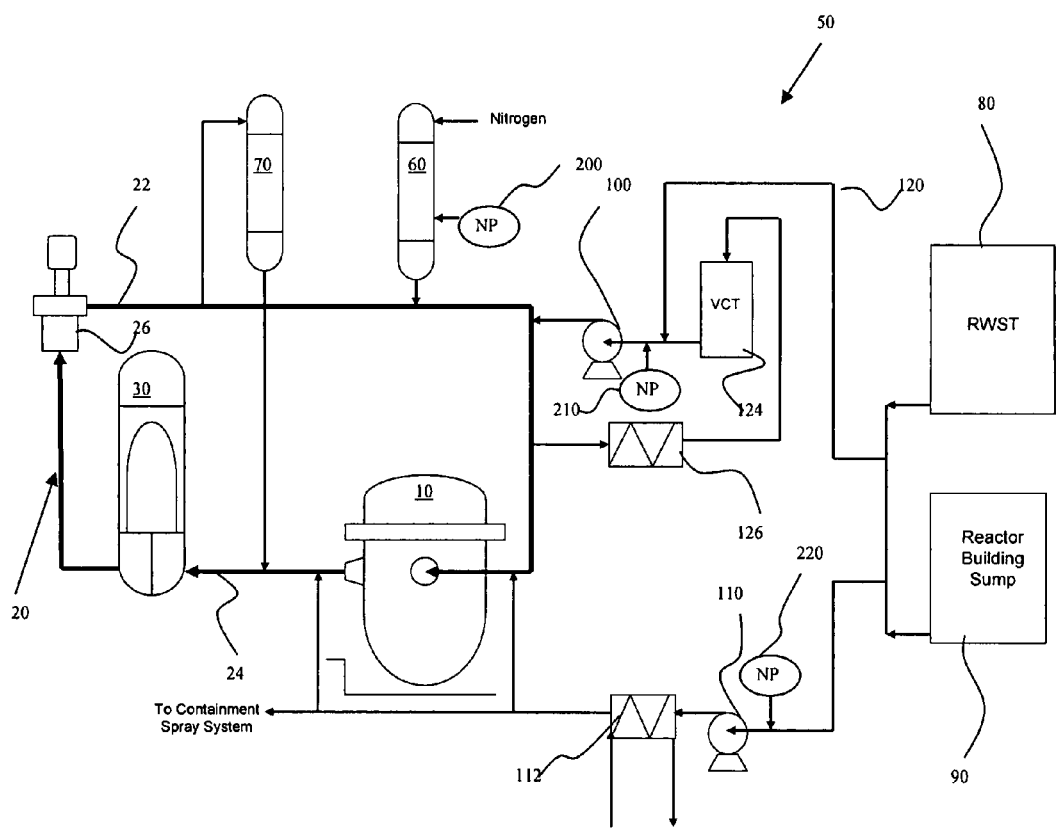
FIG. 1 shows schematically a nuclear power plant with an emergency core cooling system according to the present invention.

FIG. 1 shows a nuclear power plant having a reactor 10, a reactor coolant system 20, and an electricity generator 30. In the PWR embodiment shown, electricity generator 30 includes a secondary coolant stream and a turbine. The reactor coolant system 20 includes a cold leg 22 between generator 30 and reactor 10, and a hot leg 24 between reactor 10 and generator 30, as well as a coolant pump 26 in cold leg 22. The reactor coolant system 20 for the PWR embodiment shown also may contains one or more pressurizers 70. In a BWR embodiment, generator 30 typically includes a turbine, and RCS 20 includes a condenser.

RCS 20 recirculates water during normal operation, and in the preferred embodiment no nanoparticles are added intentionally to the RCS during normal operation, as these can cause issues with the generator and other components.

The nuclear power plant further includes an emergency core cooling system, indicated generally as 50, which includes one or more accumulators or core flooding tanks 60, a refueling water storage tank 80, a containment sump 90, a high pressure pump 100, and a low pressure pump 110.

RWST 80 is connected to the pump 100, which may be a centrifugal charging pump/high pressure injection pump, via a line 120. Pump 100 may also be connected to a volume control tank 124, which can receive water from cold leg 22 via a letdown heat exchanger 126. Pump 100 can provide water from RWST 80 or the containment sump 90 into the RCS 20 during a LOCA accident. Containment sump 90 thus provides water which collects in the containment during a severe accident, for example after RWST 80 has emptied.

Low pressure pump 110, which may be a residual heat removal/safety injection system pump, provides water from RWST 80 or containment sump 90 to a heat exchanger 112, and also to the hot leg 24, cold leg 22 and a containment spray system.

Pressurizers 70 can provide pressure to water from cold leg 22 to hot leg 24.

The present embodiment provides for a nanoparticle supply 200 which can provide concentrated nanofluid or nanoparticles into the cold leg accumulator/core flooding tank 60. Such an application increases cooling capacity in the incipient phases of a medium or large LOCA condition during which the core could become uncovered without the water delivered by the accumulator/core flooding tank 60.

Nanoparticle supply 210 can provide nanoparticles between RWST 80 or containment sump 90 and pump 100. This nanoparticle injection location is designed to help another type of LOCA scenario during which fluid losses in RCS 20 can be compensated for a longer period of time, with the core of the reactor remaining covered.

Nanoparticle supply 220 can supply nanoparticles between RWST 80 or containment sump 90 and pump 110. This nanoparticle injection location advantageously is designed to help another type of LOCA scenario during which the fluid losses from RCS 20 cannot be compensated anymore, with the core of the reactor remaining only partially covered. The pump 110 and heat exchanger 112 are designed to provide long-term cooling for several days following any LOCA or other severe accident scenario. The present invention thus advantageously can provide that the nanoparticles can be delivered when the pressure in the RCS 20 is similar to the pressure in the containment.

The nanoparticle supplies 200, 210 and 220 alone or in combination provide significant advantages over supplies which terminate in the reactor cavity, recirculation lines or the RWST. The dispersion and effectiveness of the nanoparticles is increased since the particles are dispersed right before or at locations where water is pressurized. Settling and other problems with nanoparticle effectiveness can be reduced. With all three supplies, the emergency cooling of a LOCA accident during all time periods can be improved, as will be described.

Figure 2:
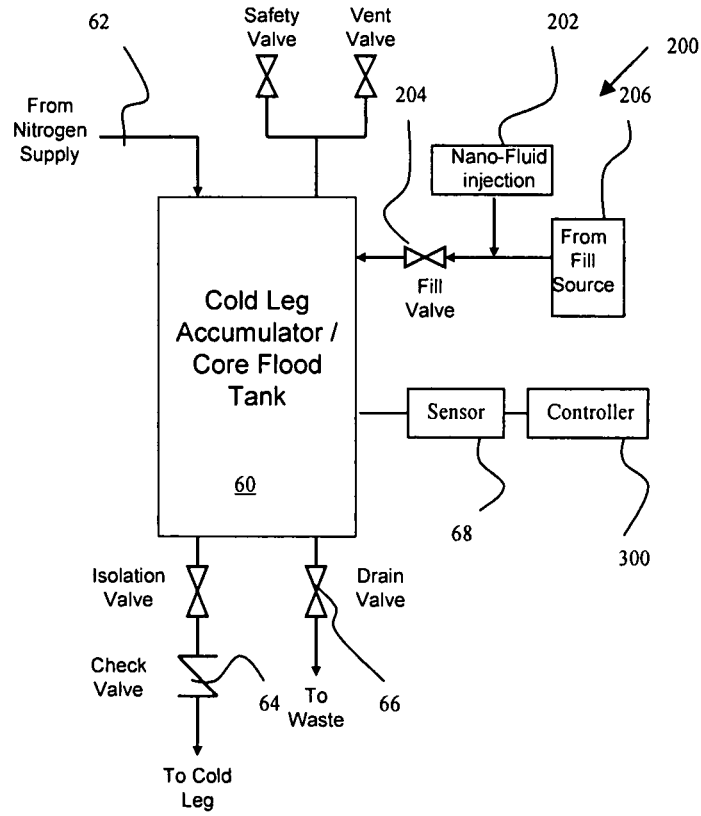
FIG. 2 shows the details of the accumulator in FIG. 1 in more detail.

FIG. 2 shows the accumulator 60 and nanoparticle supply 200 in more detail. A motor actuated valve 204, called the fill valve, has an outlet into the accumulator 60. Nanofluid in concentrated form, or pressurized gas containing nanoparticle powder, is supplied via a tank 202, and reaches the accumulator through the inlet of the valve 204. The cold leg accumulator 60 discharges water mixed with the nanofluid or nanoparticles through a check valve 64 into RCS 20.

Motor-driven valve 204 can release the concentrated nanofluid into the larger fluid volume in the accumulator or core flooding tanks 60. In one embodiment, diluted nanofluid can reside in the accumulator for a long period of time. The properties and stability of the nanofluid will be checked in accordance with the plant emergency system testing procedures, and if necessary the motor valve 204 can be actuated to permit more concentrated nanofluid or nanoparticles in tank 202 as needed to maintain the desired level in the accumulator tank 60. A fill source 206 can provide water to the accumulator 60, for example to increase the water concentration if the nanoparticle concentration in tank 60 becomes too large. Such an action can be accompanied first by draining some of the water/nanoparticle solution through a drain valve 66.

In another embodiment, the source nanomaterial can remain in tank 202 and be applied only when water in the accumulator 60 is required by the emergency cooling procedures.

The nanofluid material tank 202 may include a number of tanks with total volume and maneuverability obtained considering probabilistic calculations of various operation strategies. The tanks can be a combination of dry nanopowder silos injecting nanopowder to the outlet or concentrated nanofluid tanks injecting the liquids into the outlet. The concentrated nanofluid tanks or accumulator 60 can have a system of feed and bleed that allow addition of nanofluids or nanomaterials to the tanks at given intervals to maintain the quality of the nanofluid suspension. For tank 60 or the other tanks 202, a sensor 68 can sense the nanoparticle level, and a controller 300 can actuate the drain valve 66 and fill valve 204 (or any other valves) to provide a desired concentration. Alternate to sensor 68, an operator can enter in a determined nanoparticle concentration in accumulator 60 and desired concentration and the controller 300 can correct the concentration based on the known amounts of the accumulator volume and the concentration of nanoparticles in tank 202. In addition, the entire quality of the nanofluid in the accumulator 60 or tanks 202 may be maintained manually. The controller 300 can be used to control the valves and nanoparticle delivery throughout the course of a severe accident event, for example from a control room.

If the concentrated nanofluids are not located in the accumulator during long-term storage, the injection can proceed into the accumulator just prior to release of the accumulator fluid.

Figure 3:
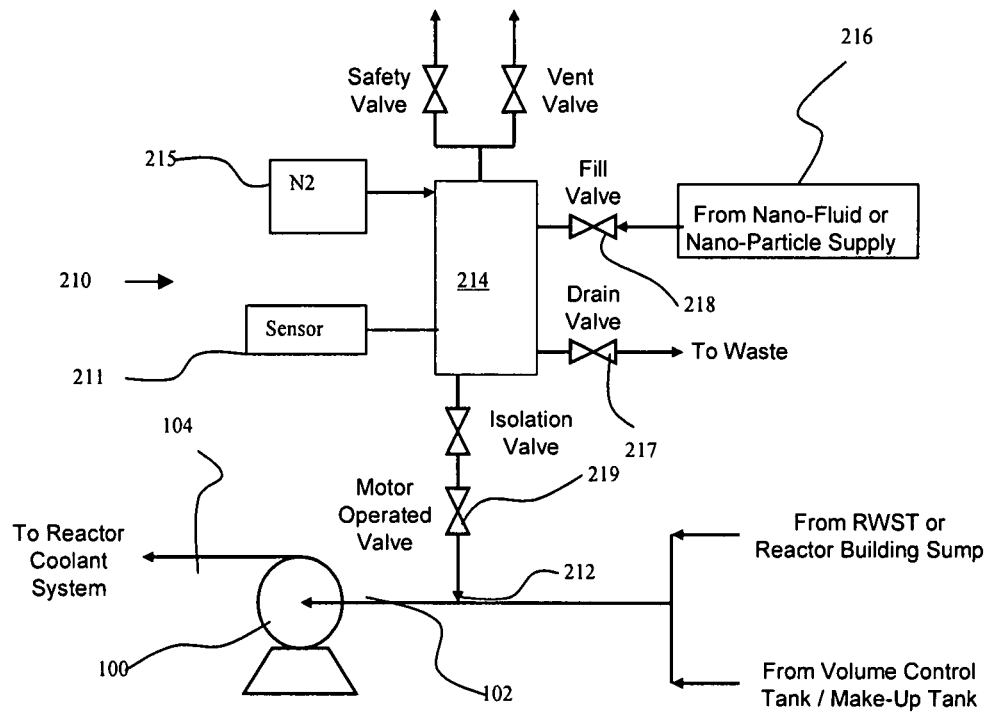
FIG. 3 shows the details of the high pressure pump area of FIG. 1 in more detail.

FIG. 3 shows nanoparticle supply 210 and high pressure pump 100 in more detail, and in this embodiment shows the outlet 212 placed at the inlet 102 of the CCP/HPIP pumps 100, which have an outlet 104. Nanoparticle supply 210 includes a nanofluid material tank 214, and a tank 216 separated by a fill valve 218. Tank 216 can include a number of tanks with total volume and maneuverability obtained considering probabilistic calculations of various operation strategies. Tank 216 can be a combination of dry nanopowder silos injecting nanopowder to the tank 214 or concentrated nanofluid tanks injecting the liquids into the same outlet 214. The concentrated nanofluid tank 214 and or tanks 216 can have a system of feed and bleed that allow addition of nanofluids or nanomaterials to the tanks at given intervals to maintain the quality of the nano-fluid suspension in tanks 214 and 216. Thus tank 214 also may have a separate input for water and a drain valve 217. A motor-operated valve 219 can be located downstream from tank 214 to provide the nanofluid to outlet 212. A sensor 211 connected to controller 300 also can be provided, controller 300 (FIG. 2) also controlling fill valve 218 and drain valve 217.

Figure 4:
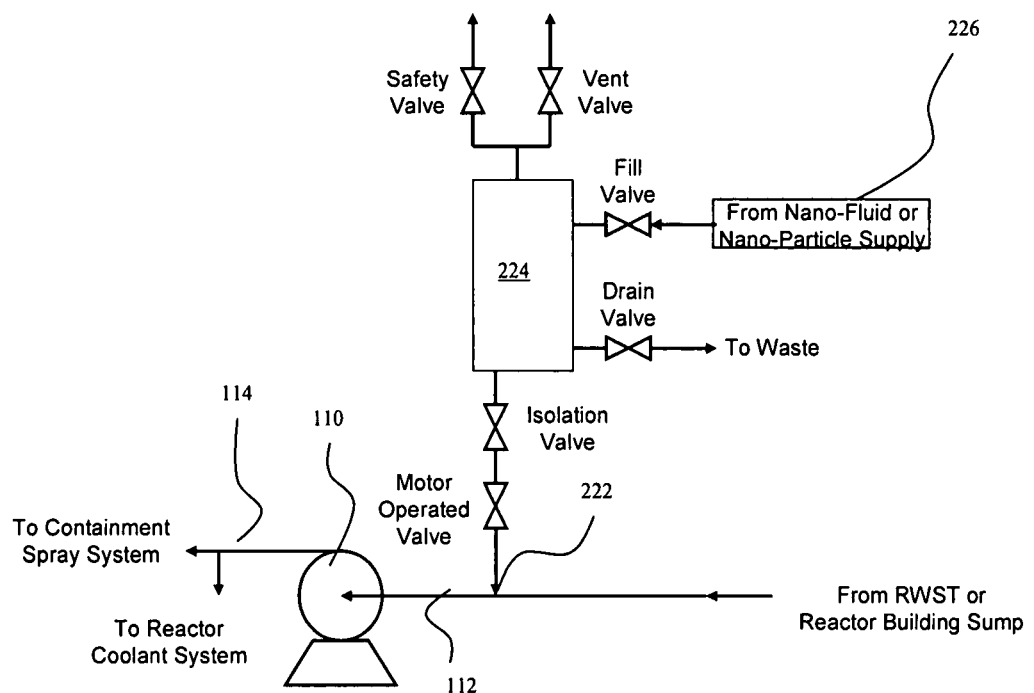
FIG. 4 show the details of the low pressure pump of FIG. 1 in more detail.

FIG. 4 shows nanoparticle supply 220, which can have tanks 224 and 226, and may be similar to the FIG. 3 embodiment. Outlet 222 can be located at the inlet 112 of the low pressure pumps 110, which have an outlet 114.

The tanks 214 can be pressurized via an inert gas source 215, for example nitrogen, so that on operation of valve 219, the tanks empty under pressure into the inlet of the centrifugal high pressure or low pressure injection pumps 100, 110 of the ECCS 50, and can include a diaphragm or other separation device so that the tanks empty only when for example the pressure differential between the small tank and the inlet of the pump exceeds a given pre-set value.

During a LOCA accident for example, the primary coolant may exit from the RCS 20 into the containment. The present invention then provides that the accumulator water released by the ECCS 50 can contain nanoparticles, either stored with the accumulator water or provided shortly before release, so that during the incipient phase of the LOCA the accumulator water provided to the reactor has increased heat removal properties.

As the RWST water is released or sump water is fed through pump 100 further nanoparticles are provided into the ECCS by nanoparticle supply 210. The nanoparticles in fluid or solid form can be rapidly mixed with the rest of the incoming fluid, so that RWST water also has increased heat removal properties.

As the containment water is recirculated and the low pressure pump 110 operates, nanoparticle supply 220 can add nanoparticles so that the RCS water and RWST and any other water such as the accumulator water has a sufficient supply of nanoparticles. Settling of the nanoparticles can also be compensated for.

The nanoparticle supplies 210 and 220 preferably deliver nanoparticles or nanofluid directly at the inlets, i.e. the headings, of the respective pumps 100, 110.

The motor-driven valves provide an advantage over manual valves, as the supply can be adjusted remotely.

Rather than nanofluids, nanoparticle supplies 200, 210 and 220 can provide solid nanopowder to be injected with the help of an inert gas flow provided from a flask with the gas pressure. The gas containing the particles in the fluid stream is discharged into the inlet of large tanks or the centrifugal high pressure or/and low pressure injection pumps of the safety system when the pressure differential between the small gas flask and the inlet of the pump would exceed a given pre-set value.

The nanoparticles are of sub-micron size, preferably in the 10-300 nanometer size. The nanoparticles preferably are non-abrasive, non-reactive and stable under severe accident conditions in view of radiation field, temperature and pressure considerations. The nanomaterials may include, but are not limited to, $ZrO_2$, C(diamond), $Al_2O_3$, $SiO_2$, $Fe_3O_4$, Cu, and CuO.

The delivery of the nanoparticles can be designed to maintain a concentration of less than 0.002 percent per volume, for example at 0.001 percent, to the reactor at each stage following a severe accident. For example, the accumulator water may be maintained with a concentration of approximately 0.001 percent (or injected prior to release to achieve this concentration), since in a severe LOCA event, the accumulator water may be fed without any RCS water being present. For the high-pressure pump nanoparticle supply, the nanoparticles can be delivered as a function of the RWST volume, as well as the RCS volume, as RCS water from the LOCA may be found in the containment and is recirculated by the containment sump. The low-pressure pump nanoparticle supply can be activated later and can be based on the accumulator volume, RCS volume and RWST volume, as well as a settling rate of the nanoparticles. These are just examples, and the exact amounts of nanoparticles released can be made dependent on nanoparticle type, reactor design, settling properties of the nanoparticles, and/or the type and severity of accident itself (for example if the LOCA is a minor or major event).

What is claimed is:

1. A nuclear power plant comprising:
   a reactor;
   a reactor coolant system;
   a generator powered by the reactor coolant system;
   an emergency core cooling system, the emergency core cooling system including a water source, a pump having a pump inlet receiving water from the water source and a pump outlet providing the water to the reactor coolant system, and a nanoparticle supply containing nanoparticles, the nanoparticle supply having a supply outlet between the pump and the water source, the nanoparticles entering the emergency core cooling system at the supply outlet when released from the nanoparticle supply.

2. The nuclear power plant as recited in claim 1 wherein the supply outlet is at the pump inlet.

3. The nuclear power plant as recited in claim 1 wherein the pump is a high-pressure pump.

4. The nuclear power reactor as recited in claim 3 wherein the pump outlet connects to the reactor coolant system downstream of the generator and upstream of the reactor.

5. The nuclear power plant as recited in claim 1 wherein the nanoparticle supply includes a nanofluid.

6. The nuclear power plant as recited in claim 1 wherein the pump is a low-pressure pump.

7. The nuclear power plant as recited in claim 1 wherein the emergency core cooling system includes a heat exchanger, the pump outlet being connected to the heat exchanger.

8. The nuclear power plant as recited in claim 1 wherein the emergency core cooling system includes a second pump, and further comprising a second nanoparticle supply having a second supply outlet between the second pump and the water source.

9. The nuclear power plant as recited in claim 1 wherein the water source is a water storage tank.

10. The nuclear power plant as recited in claim 1 wherein the water source is a containment sump.

11. The nuclear power plant as recited in claim 1 wherein the water source is a containment sump and a water storage tank.

12. The nuclear power plant as recited in claim 1 wherein the nanoparticle supply is $ZrO_2$.

13. The nuclear power plant as recited in claim 1 wherein the nanoparticle supply is C.

14. The nuclear power plant as recited in claim 1 wherein the nanoparticle supply is $Al_2O_3$.

15. The nuclear power plant as recited in claim 1 wherein the nanoparticle supply is $SiO_2$.

16. The nuclear power plant as recited in claim 1 wherein the nanoparticle supply is $Fe_3O_4$.

17. The nuclear power plant as recited in claim 1 wherein the nanoparticle supply is Cu.

18. The nuclear power plant as recited in claim 1 wherein the nanoparticle supply is CuO.

19. The nuclear power plant as recited in claim 1 wherein the nanoparticle supply is one of $ZrO_2$, C, $Al_2O_3$, $SiO_2$, $Fe_3O_4$, Cu and CuO.

20. A nuclear power plant comprising:
a reactor;
a reactor coolant system;
a generator powered by the reactor coolant system; and
an emergency core cooling system having:
    an accumulator having an accumulator outlet exiting in the reactor coolant system and a first nanoparticle supply having a supply outlet exiting into the accumulator;
    a high pressure source of water including a first water source, a high pressure pump coupled to the first water source, and a second nanoparticle supply having a supply outlet between the high pressure pump and the first water source; and
    a low pressure source of water including a second water source, a low pressure pump coupled to the second water source, and a third nanoparticle supply having a supply outlet between the low pressure pump and the second water source.

21. The nuclear power plant as recited in claim 20 wherein the first, second and third nanoparticle supplies provide a nanofluid.

22. The nuclear power plant as recited in claim 21 wherein the first, second and third nanoparticle supplies provide a pressurized gas containing nanoparticles.

23. The nuclear power plant as recited in claim 20 wherein the nanoparticle supply is $ZrO_2$.

24. The nuclear power plant as recited in claim 20 wherein the nanoparticle supply is C.

25. The nuclear power plant as recited in claim 20 wherein the nanoparticle supply is $Al_2O_3$.

26. The nuclear power plant as recited in claim 20 wherein the nanoparticle supply is $SiO_2$.

27. The nuclear power plant as recited in claim 20 wherein the nanoparticle supply is $Fe_3O_4$.

28. The nuclear power plant as recited in claim 20 wherein the nanoparticle supply is Cu.

29. The nuclear power plant as recited in claim 20 wherein the nanoparticle supply is CuO.

30. The nuclear power plant as recited in claim 20 wherein the nanoparticle supply is one of $ZrO_2$, C, $Al_2O_3$, $SiO_2$, $Fe_3O_4$, Cu and CuO.

\* \* \* \* \*